Sept. 26, 1950     B. G. COPPING     2,523,497
THERMOSTATICALLY CONTROLLED VENTILATOR
Filed Nov. 7, 1946     4 Sheets-Sheet 1
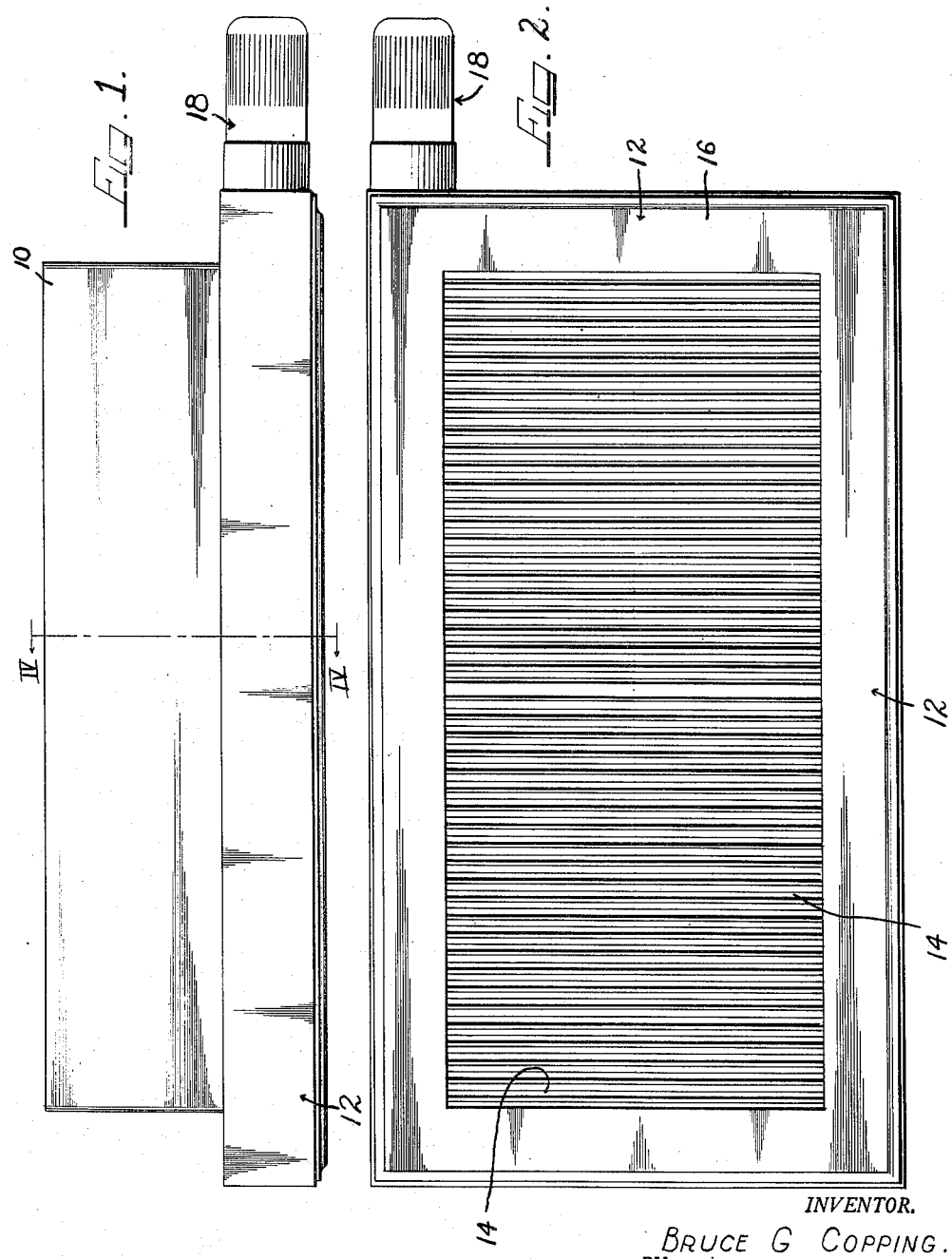
INVENTOR.
BRUCE G COPPING.
BY
The Firm of Charles W Hills
Attys.

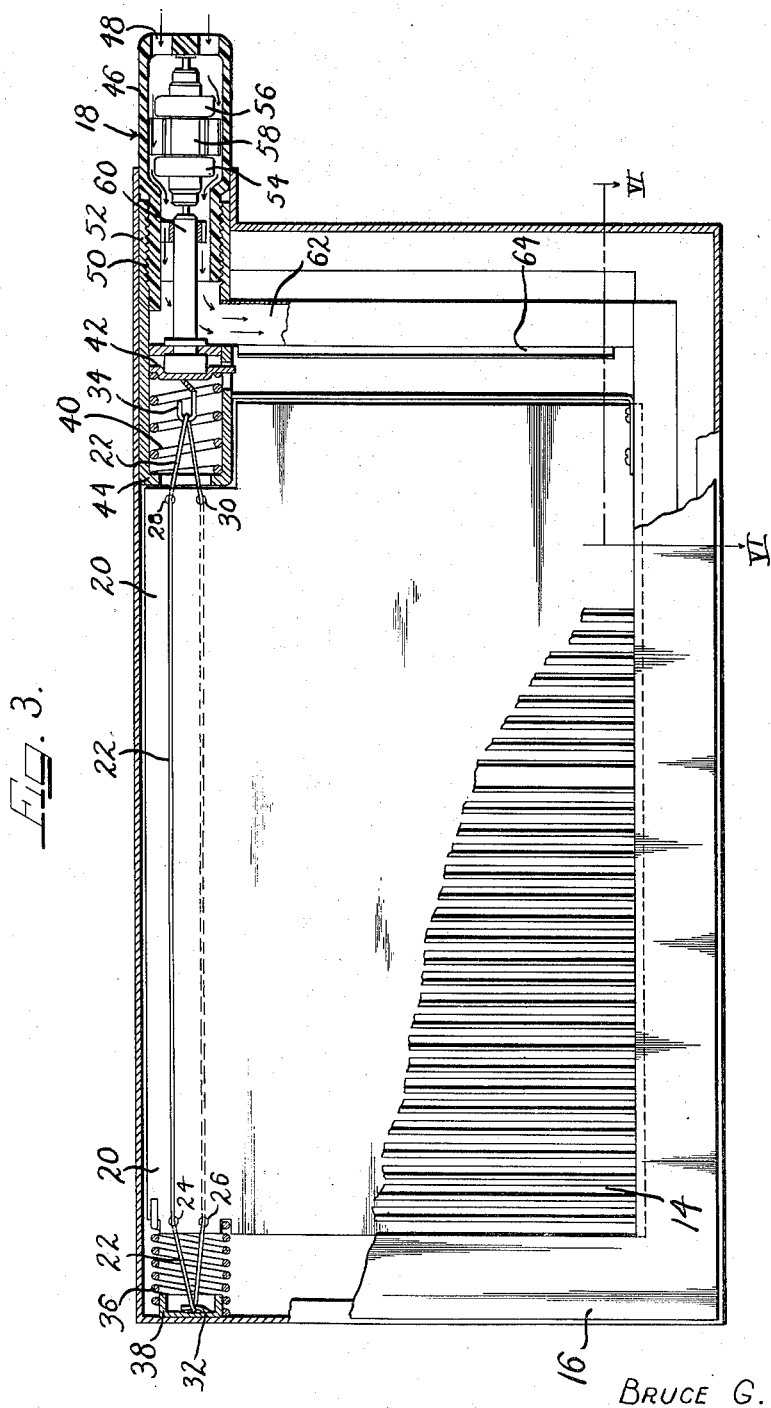

Sept. 26, 1950 B. G. COPPING 2,523,497
THERMOSTATICALLY CONTROLLED VENTILATOR
Filed Nov. 7, 1946 4 Sheets-Sheet 3
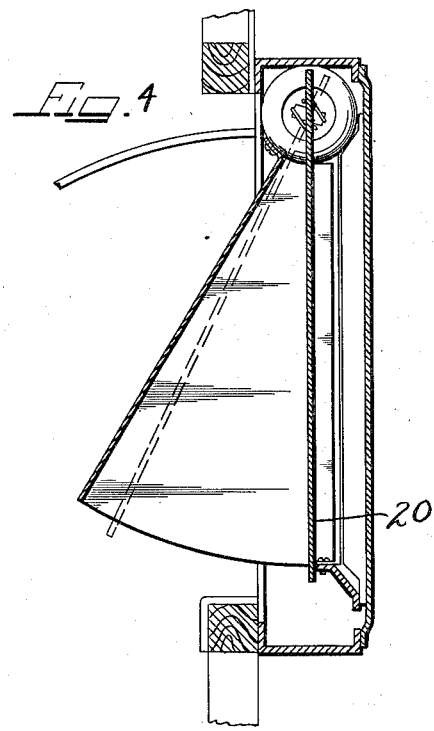
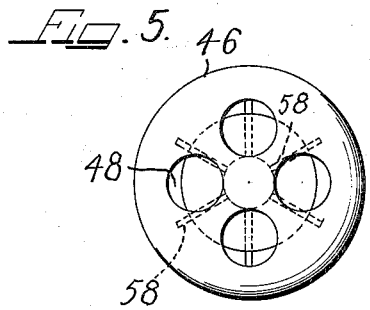
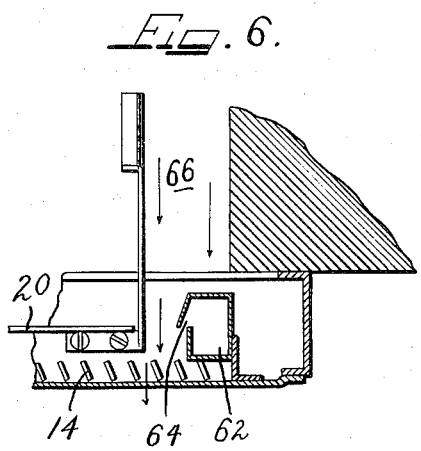
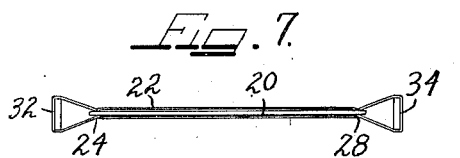
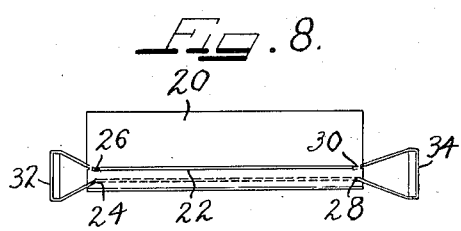
INVENTOR.
BRUCE G. COPPING.
BY
The Firm of Charles W. Hills
Attys.

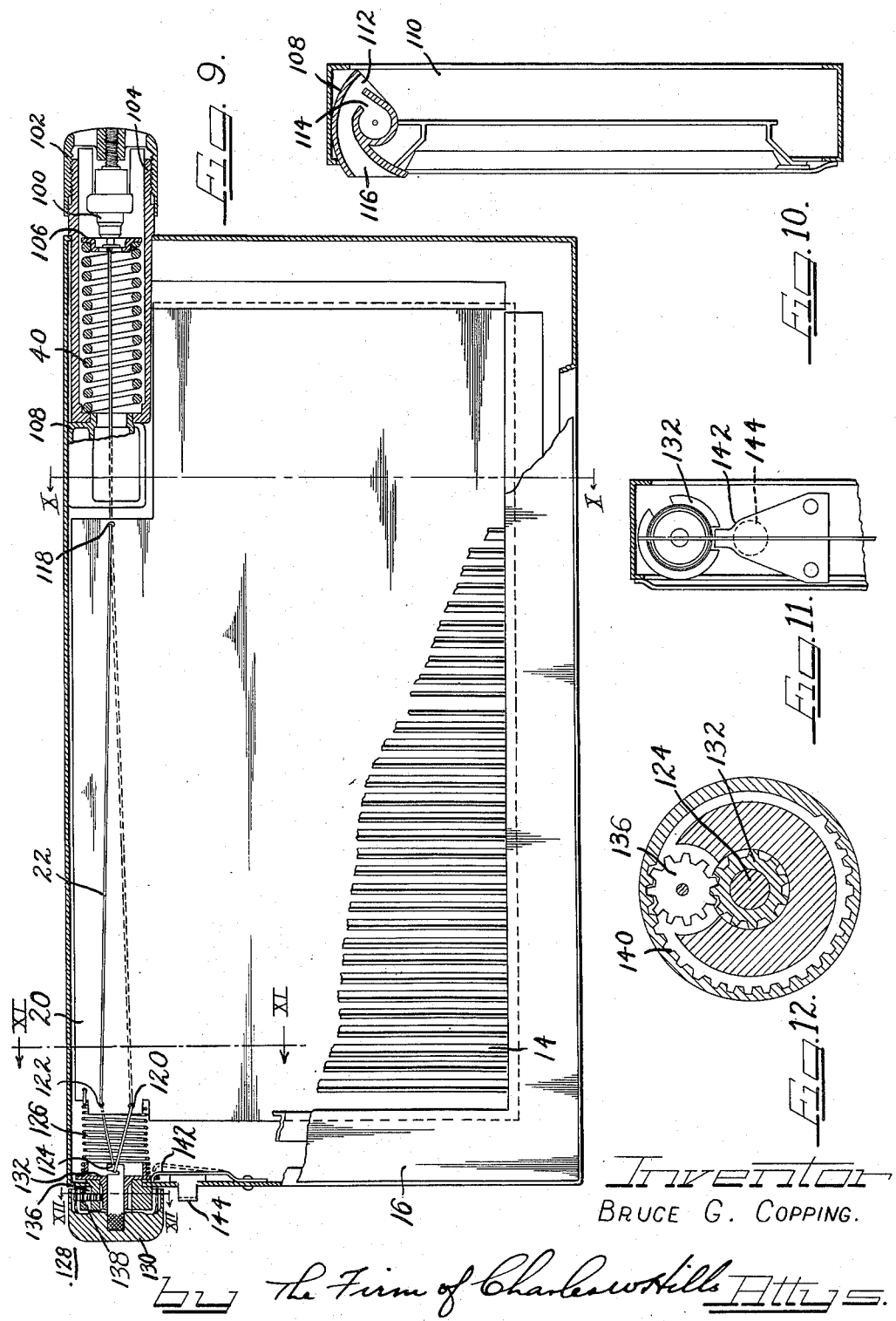

Patented Sept. 26, 1950

2,523,497

UNITED STATES PATENT OFFICE 2,523,497

THERMOSTATICALLY CONTROLLED VENTILATOR

Bruce G. Copping, Atlanta, Ga., assignor to Don Manufacturing Company, Chicago, Ill., a corporation of Illinois Application November 7, 1946, Serial No. 708,224

1 Claim. (Cl. 236—49)

My invention relates to a ventilator for controlling the supply of conditioned air to a room or other space.

One of the problems associated with the application of hot or cold air systems to ventilate a room is that of properly controlling the passage of air from the heating or cooling unit to the room itself. Thus, in hot air heating systems it is common experience that the radiators provided to pass the heated air to the various rooms are ineffective properly to apportion the amount of heat supplied the various rooms. Thus, it is necessary frequently to adjust the shutters of these radiators to the end that the temperatures in the various rooms may be kept at the desired value. This is a source of considerable annoyance and inconvenience to the user, particularly if the duct is also connected to another radiator located at a different part of the building so that to increase the heat supplied one room, the inhabitant must change the setting of the radiator in a room far distant therefrom.

In one method of automatically controlling the supply of conditioned air to a room, the position of a control shutter, and hence the air supply thereto, is varied in accordance with the room temperature. Thus, in a hot air heating system, as the room tends to heat, the shutter is closed whereas as the room tends to cool the shutter is opened. By providing such means on all the radiators in the various rooms or other spaces to be heated, the available heating air is automatically distributed in accordance with the various room temperatures, and no manual adjustment is required.

It is an object of my invention to provide an improved thermostatically controlled room ventilator.

It is a further object of my invention to provide an improved thermostatically controlled room ventilator wherein the thermostat is influenced to a minimum degree by the temperature of the conditioned air controlled thereby and to a maximum degree by the average temperature condition within the space to be controlled.

Further it is an object of my invention to provide an improved thermostatically controlled ventilator wherein air flow is induced across the thermostatic element to the end that this element shall partake of the temperature within the room or space ventilated rather than the temperature of the conditioned air passed therethrough.

Another object of my invention is to provide an improved thermostatically controlled ventilator which may be applied to air cooling as well as air heating systems.

Yet another object of my invention is to provide an improved thermostatically controlled room ventilator wherein a single unit may be adjusted either to operate in conjunction with an air heating system or an air cooling system by a simple adjustment.

It is yet another object of my invention to provide an improved thermostatically controlled room ventilator that is completely self contained and relies in no degree on external elements, electrical or mechanical, and which is susceptible of simple adjustment to alter the regulated room temperature.

Further it is an object of my invention to provide an improved thermostatically controlled room ventilator suitable for use with thermostatic elements having a small mechanical movement as temperature is varied and having simple and reliable means for converting this movement to corresponding opening and closing of the shutter.

Still another object of my invention is to provide an improved thermostatically controlled room ventilator having features of construction, combination, and arrangement, whereby no close fits or accurately machined parts are required to the end that the construction thereof be simplified and a reliable complete unit obtained.

In accordance with still another object of my invention an improved thermostatically controlled room ventilator is provided in which the change in air supply to the room for any particular change in room temperature is substantially constant to the end that the regulation of the air temperature is uniform over the various conditions of operation.

The novel features which I believe to be characteristic of my invention are set forth with particularity in the appended claim. My invention, itself, however, both as to its organization and method of operation, together with further objects and advantages thereof, may best be understood by reference to the following description taken in connection with the accompanying drawings.

In the drawings:

Figures 1 and 2 are top and side views respectively, of a complete hot air control ventilator incorporating the principles of my invention;

Figure 3 is a partial cross section view showing further details of the structure of the ventilator of Figure 2;

Figure 4 is a cross section view of the ventilator in Figure 1 taken along axis IV—IV, Figure 1;

Figure 5 is an end view of the thermostatic element of the device of Figures 1 and 2;

Figure 6 is a cross section view taken along axis VI—VI, Figure 3;

Figures 7 and 8 are diagrammatic sketches illustrative of the operation of the shutter control mechanism of the embodiment of my invention shown in Figures 1 and 2;

Figure 9 is a modified form of my invention particularly suitable for use in controlling the supply of cool air to a room as well as the supply of hot air thereto;

Figure 10 is a cross-sectional view through section X—X, Figure 9;

Figure 11 is a cross-sectional view taken on line XI—XI of Figure 9; and

Figure 12 is a cross-sectional view through section XII—XII, Figure 9.

Referring now to Figures 1 and 2 which show top views and side views respectively of a ventilator constructed in accordance with the principles of my invention, 10 indicates the body portion of the ventilator which is connected to a source of heated air. As will be described in further detail hereafter, this body portion contains a shutter to control the amount of air passed to the room. The front part of the ventilator is indicated generally at 12, Figure 2. This portion consists of louvres 14 which are surrounded by mounting plate 16. The thermostatic control element for controlling the amount of hot air supplied to the room is contained within the control housing shown generally at 18.

The construction of the inner portion of the ventilator of Figures 1 and 2 is shown in further detail in Figure 3. In that figure the control shutter indicated at 20 is arranged in a manner to be described in further detail hereafter to open or close the opening through louvres 14. In the open position the shutter assumes the position shown in the dotted lines of Figure 4 whereas in the closed position it assumes the position of the solid lines of Figures 3 and 4. Shutter 20 is supported by cord or wire 22 which passes through holes 24, 26, 28 and 30 in the upper portion of shutter 20 and is supported at opposite ends by members 32 and 34. As shown in the figures the shutter 20 naturally tends by the force of gravity to assume the closed position of Figures 3 and 4, a tendency that is supplemented by torsion spring 36 which coacts with anchor member 38 to bias shutter 20 to the closed position. Spring 36 may be attached to anchor 38 by any suitable means as, for example, a bent in end portion engaging an opening in member 38. Compression spring 40 is provided to engage member 42 on one hand and housing 44 on the other so as to bias member 34 in a direction to tighten cord or wire 22. That is, the tendency of spring 40 to increase its axial length against housing 44 forces member 42 to the right as seen in Figure 3, thus forcing member 34 to the right and tightening cord 22.

The method by which shutter 20 is opened or closed by cord 22 may best be understood by reference to Figures 7 and 8 which show to an exaggerated degree the action of the coacting parts in the accomplishment of this end. Both of these views are top views of the unit, Figure 7 corresponding to the closed position shown in Figures 3 and 4 and Figure 8 corresponding to the open position. In Figure 7, members 32 and 34 are relaxed so as to loosen cord 22. In this case cord 22 simply provides support for shutter 20 without exerting any tendency to rotate that member. This results from the fact that the tension of wire or cord 22 is sufficiently small when merely supporting member 20 that little torque is exerted by reason of the passage of the cord through holes 24 and 28 on one side of member 20 and holes 26 and 30 (not shown) on the other side of member 20. On the other hand, when members 32 and 34 are pulled apart as is shown in Figure 8, cord 22 is tightened and tends to rotate shutter 20 in the direction to decrease the actual tension on the cord. In this case, shutter 20 is rotated backwardly as shown in Figure 8, since motion in this direction reduces the tension on cord 22 in comparison with the displacement between members 32 and 34. It will be observed that the cord in passing through holes 24 and 28 to the top side of shutter 20 as shown in Figure 8 tends to exert a downward force thereon whereas the cord passing through holes 26 and 30 to the lower side of member 20 exerts an upward force thereon. These two forces combine as a torque acting on shutter 20 and tending to turn shutter 20 in the backward direction as seen from Figures 7 and 8. Consequently tightening of members 32 and 34 rotates member 20 backwardly. In the actual shutter construction shown in Figures 3 and 4 this same effect takes place so that as spring 40 forces member 42, and hence member 34, to the right as shown in Figure 3, the shutter 20 is rotated backwardly to the position shown in the dotted lines of Figure 4 and thus permits air to pass through louvres 14. On the other hand, as the force of spring 40 is overcome by pressure against member 42 in the left hand direction cord 22 is loosened and the shutter 20 assumes the vertical position by reason of its own mass and the torque of balancing spring 36.

It is the function of the thermostatic control element, shown generally at 18, to move member 42 and hence rotate shutter 20 in accord with the temperature of the room to which the regulator is connected. To this end, thermostat housing 46 is provided with holes 48 in one end thereof and threads 50 at the other end to engage corresponding threads in housing 52. Within thermostat housing 46 are contained two thermostatic elements 54 and 56, which act against supporting structure 58 and the end of housing 46 to press against member 60 and hence oppose the action of spring 40 in moving member 42 to the right as seen in Figure 3. Supporting structure 58 is intimately attached to elements 54 and 56 and contains a plurality of fins to facilitate heat transfer passageway through housing 46. Control elements 54 and 56 may be any one of the various types well known in the thermostatic control art. Preferably they are of the so-called "Vernet" type wherein the change in volume of a material during its transformation from one physical state to another is utilized to effect the movement of a control element. It is, of course, a well known fact that a change in volume takes place in most materials when the material changes from a solid to a liquid state or from a liquid to a gaseous state and these elements utilize such volume changes to effect a change in the length thereof throughout a predetermined temperature range. Thus, as the temperature of elements 54 and 56 is increased, the length thereof is increased and member 60 is pushed to the left as seen in Figure 3. This action opposes the action of spring 40, thereby permitting shutter 20 to assume the closed position.

On the other hand, if the temperature of elements 54 and 56 is decreased, the length thereof is correspondingly reduced, member 60 is permitted to move to the right in accordance with the force exerted by spring 40 and member 20 is rotated backwardly to the position shown in the dotted lines of Figure 4. In this case, more heated air is permitted to enter the room.

It is the purpose of duct 62, Figure 3, to cause "Vernet" elements 54 and 56 to partake of the average air temperature within the room to which the ventilator is attached. To this end openings 48 are provided in the end of member 46 and member 58 is constructed as shown in the dotted lines of Figure 5, thereby to permit passage of air longitudinally through member 46 as shown in the arrows of Figure 3. Duct 62 depends from housing 44 and projects downwardly with a cross section as shown in Figure 6. This duct contains opening 64 which faces outwardly and is in the path of hot air entering the room through louvres 14. To the end that air flow shall always pass by opening 64 regardless of the position of shutter 20, a separate passage 66 is provided on the side of shutter 20, this passage permitting air flow as shown in the arrows of Figure 6 regardless of the open or closed position of shutter 20.

In operation, air flowing through passage 66 passes immediately in front of opening 64 at substantially increased velocity because of the smaller area available for such passage at that points. The pressure head of the air in the back portion of passage 66 is thus converted to velocity head and a low pressure area produced immediately in front of opening 64. This draws air from duct 62 and hence from the area about elements 54 and 56 and through openings 48 in member 46. Since this air is taken from the room itself, it partakes of the average temperature therein and influences elements 54 and 56 accordingly.

It is the function of spring 36 to supplement the gravitational forces acting on shutter 20 to cause that shutter to assume a closed position. In addition this spring provides a degree of control over the shutter movement corresponding to various temperature changes of the control elements 54 and 56. It will be apparent to those skilled in the art that the position assumed by the shutter depends on the various forces acting thereon, including the torque of the cord 22 associated with the action of spring 40 as modified by the action of the control elements 54 and 56, the gravitational force or weight of the shutter itself, the force exerted by the passage of air supply past the shutter, and, finally, the force associated with the action of the spring 36. Uniform operation will, of course, be achieved when the net force acting to close or open the shutter is the same for all temperature variations irrespective of actual shutter position.

In accordance with one feature of my invention, the members 32 and 34 are rotated from the horizontal position and spring 36 is wound up so as to balance out the variations in return force on the shutter 20 incident to the above-mentioned forces. In a practical embodiment of the ventilator, for example, it has been found satisfactory to place members 32 and 34 at an angle of approximately 115 degrees from the closed position of shutter 20 as shown in Figure 4 and to wind up spring 36 approximately 300 degrees in the direction tending to close the shutter. Under these conditions, the variations in biasing force of spring 36, together with the variations in effectiveness of the cord 22 and the changes in gravitational and windage forces cause the shutter 20 to move in a substantially uniform fashion regardless of the shutter position.

The complete operation of my improved ventilator may now be described in detail. Regardless of the initial position of shutter 20, the heating air under slight pressure applied to the unit from the heating system causes passage of air across opening 64 of duct 62 as shown in the arrows of Figure 6. This causes air to be drawn past elements 54 and 56, this air being taken from the general air of the room to which the ventilator is connected. If, for example, the air in the room is cooler than the desired temperature thereof, the air drawn past elements 54 and 56 will be cooler than the desired air and elements 54 and 56, partaking of the temperature of the air actually passing by them, will contract, thereby permitting spring 40 to extend and rotating shutter 20 backwardly to open the passage to louvres 14 as shown by the dotted lines of Figure 4. In this case, hot air will be permitted to pass freely to the room. However, as the room temperature exceeds the desired temperature, the air drawn past elements 54 and 56 by reason of the aspirator action of opening 64 in duct 62 is of increased temperature and these elements accordingly increase in length. This causes member 60 to oppose the force of spring 40 and move member 42 to the left as shown in Figure 3, thereby loosening cord 22 and permitting shutter 20 to close by reason of its own weight and the bias of spring 36. The air supply to the room is thereby discontinued and the heating thus prevented. In actual operation, of course, the shutter 20 will assume an intermediate position in which the amount of air introduced to the room is just sufficient to maintain elements 54 and 56 at nearly the desired temperature.

Adjustment of the setting at which the room temperature is maintained is provided for by the threaded engagement between housing 46 and member 52. As housing 46 is rotated, it is moved in or out with respect to member 52, thereby varying the temperature of elements 54 and 56 required to maintain shutter 20 in any particular position. Thus, if it is desired to cause the ventilator to discontinue the flow of heated air at a lower room temperature, housing 46 is rotated to cause elements 54 and 56 to move in the lefthand direction as shown in Figure 3 so that a lower temperature thereof causes closing of shutter 20. On the other hand, if it is desired to cause the regulated room temperature to be higher, member 46 is rotated to move elements 54 and 56 in the righthand direction of Figure 3 so that a greater temperature is required before the length of these elements increases to the value required to overcome the action of spring 40 and permit the shutter 20 to close.

Figures 9 to 12 are views of an alternative embodiment of my invention having a modified aspirator and capable of operating with an air cooling as well as an air heating system. This embodiment utilizes a single thermostatic control element 100 which may, of course, be of the "Vernet" type and which is encased in rotatable housing 102. Adjustment of the position of element 100, and hence the shutter position for a particular temperature thereof is achieved by the threaded connection of housing 102 with support 104. The spring 40 coacts with the opposite end of support 104 so as to oppose the action of element 100 and to determine the position of element 106 to which the cord 22 is attached. The support 104 further acts as a duct about element 100 and communicates at its opposite end with member 108 which acts as an aspirator to induce air flow past element 100.

The construction of element 108 may best be understood by reference to Figure 10 which is a cross sectional view through lines X—X, Figure 9. As shown in this figure, the member 108 has at one end an opening 112 in communication with space 110 containing air for supply to the room. Member 108 further has an opening 116 which is not affected by the operation of shutter 20 and which permits constant air flow to the room. Openings 114 communicating with member 104 is provided at the side of opening 112, thus causing aspirator action as the air flows past the opening 112 and producing air flow within member 104 to cause element 100 to partake of the room temperature.

A further feature of the structure of Figures 9 to 12 resides in the cord suspension used to support shutter 20 and control the position thereof. This suspension terminates at a single point in member 106 and passes through a single opening 118 in member 20 at the right end thereof so that no torque at this end results from tensioning the cord. On the opposite end, cord 22 passes through openings 120 and 122 in shutter 20 and is attached to a support 124 similar to the support 32 of Figure 3 so as to cause torque on the shutter as cord 22 is tensioned.

The cord suspension of Figure 9 is particularly suitable for use in ventilators intended to control the supply of cool air to a room as well as the supply of hot air. In the former case it is necessary automatically to close the shutter 20 when the room becomes too cool and open the shutter when the room heats. This reversal in the shutter operation can be obtained in the structure of Figure 9 by simply rotating member 124 and changing the twist of spring 126. That is, if the member 124 is twisted in the direction of the shutter motion so that the position of the cord as it passes through openings 120 and 122 is changed, increased tension thereof tends to close rather than open the shutter. Rotation of the anchorage of spring 126 in the opposite direction causes that spring to bias the shutter to the opened rather than the closed position. Increased length of element 100 will then open the shutter and decreased length will close the shutter, thus accomplishing the desired cooling control.

Figure 9 further shows means simply to convert the unit from automatic hot air control to automatic cool air control. This mechanism, shown generally at 128, is best understood by reference to Figure 12 which is a cross sectional view through axis XII—XII, Figure 9. From this view, together with Figure 9, it will be evident that member 124 passes through member 132 and is attached at its opposite end to control knob 130. Member 132 is provided with gear teeth in part of the region it surrounds member 124. It further serves as an anchor for spring 126 and alters the bias of spring 126 upon rotation. The gear teeth of member 132 coact with pinion 136 which is rotatably mounted on pin 138 which is in turn mounted on the ventilator housing. Pinion 136 is also in engagement with internal teeth 140 of knob 130.

When control knob 130 is rotated from the position shown in Figure 9 over an angle of, say, 230 degrees, so as to twist member 124 to the position to cause cord 22 to close the shutter 20 upon increased tension, the rotation of member 132 associated with the rotation of pinion 136 by the internal teeth on knob 130 is sufficient to unwind spring 126 and wind it up in the opposite direction so as to bias shutter 20 to the open position. Thus a single rotation of the control knob accomplishes all the changes required to convert the unit from operation as a hot air control to a cool air control.

It is the function of member 142 to anchor member 124 and spring 126. As shown in Figure 11, member 132 is provided with two recessed portions into which member 142 fits so as to prevent rotation of member 132, these portions being provided at the points at which member 132 is to be anchored. Pin 144 is provided on member 142 to permit disengagement of that member when it is desired to change the unit from heating to cooling operation.

It will be observed that my invention provides an improved shutter control system capable of converting a small but powerful motion due to the control element to a large motion of shutter 20. In addition, this arrangement does not require accurately machined parts as it relies only on the simple mechanism consisting of a cord of string or wire 22 supported by members 32 and 34, thereby providing economy of construction and reliability of operation.

It will further be observed that control elements are not subjected to the temperature of the heated or cooled air passed to the space to be controlled but on the contrary are in direct engagement with air sampled from the room itself. Thus, the unit opens or closes in accordance with the average air temperature to which the occupant of the room is exposed rather than any local temperature conditions about the control unit. The influence of the heated or cooled air passing through the ventilator may be further reduced in those applications where such steps are considered necessary by constructing member 60 and housing 46, together with member 104 and housing 102 (Fig. 9) of plastic composition having low thermal conductivity. This is, of course, an added refinement not necessary in ordinary installations.

While I have shown particular embodiments of my invention, it will of course be understood that I do not wish to be limited thereto since many modifications both in the elements used and their cooperative structure may be made without departing from the spirit and scope thereof. I, of course, contemplate by the appended claim to cover any such modifications as fall within the true spirit and scope of my invention.

I claim as my invention:

In an air flow controller, a housing defining an air passage, a rotatable shutter in control of the air flow through said passage, suspension members extending between the shutter and the housing and being twisted so as to torsionally load the shutter, tensioning means connected to the suspension members for controlling rotation of the shutter by variably tensioning the suspension members to change the torsional load on the shutter, resilient means for applying an initial torsional force to the suspension means, whereby the shutter will be torsionally balanced, a tensioning spring for applying a longitudinally axial force to the suspension means to establish a condition of equilibrium wherein the shutter will assume a predetermined angular position within the air passage, a thermostat cooperatively related to said tensioning means and operable to deliver variable longitudinal loads thereto in response to temperature variations whereby the position of the shutter may be thermostatically controlled, and a connection at one end of the shutter carried by the frame and connected to the twisted suspension members and the resilient means whereby the direction of twist may be reversed as for modifying the operation of the air flow controller for different control requirements.

BRUCE G. COPPING.

REFERENCES CITED

The following references are of record in the file of this patent:

UNITED STATES PATENTS

| Number | Name | Date |
|---|---|---|
| 1,271,313 | Hayden | July 2, 1918 |
| 1,561,425 | Fernandez | Nov. 10, 1925 |
| 1,833,950 | Modine | Dec. 1, 1931 |
| 2,187,767 | Akers | Jan. 23, 1940 |
| 2,241,103 | Akers | May 6, 1941 |
| 2,300,418 | Hall | Nov. 3, 1942 |
| 2,388,253 | Dady | Nov. 6, 1945 |